(12) United States Patent
Liu

(10) Patent No.: US 12,349,655 B1
(45) Date of Patent: Jul. 8, 2025

(54) PET TOY

(71) Applicant: Shenzhen LEPLE Technology Co., Ltd., Guangdong (CN)

(72) Inventor: Zhiping Liu, Guangdong (CN)

(73) Assignee: Shenzhen LEPLE Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/904,555

(22) Filed: Oct. 2, 2024

(30) Foreign Application Priority Data

Sep. 2, 2024 (CN) .......................... 202411222308.0

(51) Int. Cl.
*A01K 15/02* (2006.01)

(52) U.S. Cl.
CPC .................................. *A01K 15/025* (2013.01)

(58) Field of Classification Search
CPC .... A01K 15/025; A01K 5/0114; A01K 15/02; A01K 15/026; A01K 15/027; A63H 33/18
USPC .......................................... 119/707, 709, 710
See application file for complete search history.

(56) References Cited

U.S. PATENT DOCUMENTS

| | | | | |
|---|---|---|---|---|
| 5,540,187 A | * | 7/1996 | Udelle | A01K 15/025 119/706 |
| 5,634,435 A | * | 6/1997 | Udelle | A01K 15/025 119/706 |
| 5,794,568 A | * | 8/1998 | Udelle | A01K 15/024 446/397 |
| 5,806,465 A | * | 9/1998 | Baiera | A01K 15/025 273/369 |
| 8,109,239 B1 | * | 2/2012 | Smestad | A01K 15/025 119/702 |
| 10,863,720 B1 | * | 12/2020 | Tsengas | A01K 15/025 |
| 10,869,461 B1 | * | 12/2020 | Kreischer | A01K 15/025 |
| 2001/0047770 A1 | * | 12/2001 | Pontes | A01K 15/025 119/707 |
| 2006/0194504 A1 | * | 8/2006 | Ragonetti | A01K 15/025 446/46 |
| 2007/0289550 A1 | * | 12/2007 | Huang | A01K 15/025 119/707 |
| 2009/0199784 A1 | * | 8/2009 | Oblack | A01K 15/025 119/707 |
| 2010/0236496 A1 | * | 9/2010 | Comerford | A01K 15/025 119/707 |
| 2011/0308477 A1 | * | 12/2011 | Durrani | A01K 15/025 119/709 |
| 2012/0234258 A1 | * | 9/2012 | Cook | A01K 15/025 119/708 |
| 2015/0201584 A1 | * | 7/2015 | Crane | A01K 15/025 119/707 |

(Continued)

*Primary Examiner* — Morgan T Jordan
(74) *Attorney, Agent, or Firm* — JEEN IP LAW, LLC

(57) ABSTRACT

A pet toy includes a flexible bag, a driving component, and a movable component. The flexible bag defines a storage space and notches. The notches are defined on edges of the flexible bag and communicated with the storage space. A fixed part of the driving component is connected to the flexible bag, a driving part of the driving component is located in the storage space and connected to a fixed end of the movable component. The driving part of the driving component drives the movable component to move. During a movement process of the movable component, the movable component partially extends and retracts from any one of the notches.

9 Claims, 8 Drawing Sheets

(56) References Cited

U.S. PATENT DOCUMENTS

| | | | | |
|---|---|---|---|---|
| 2015/0305305 A1* | 10/2015 | Liu | .................. | A01K 15/025 |
| | | | | 119/707 |
| 2022/0287273 A1* | 9/2022 | Woods | .................. | A01K 15/025 |
| 2023/0354777 A1* | 11/2023 | Hamill | .................. | A01K 15/025 |
| 2024/0016122 A1* | 1/2024 | Carmody, III | ....... | A01K 15/027 |
| 2024/0268349 A1* | 8/2024 | Guo | .................. | A01K 15/025 |
| 2024/0306605 A1* | 9/2024 | Salyer | .................. | A01K 15/025 |
| 2024/0365751 A1* | 11/2024 | Wilson | .................. | A01K 15/025 |

\* cited by examiner

PET TOY

TECHNICAL FIELD

This application relates to the field of pet supplies, specifically involving a pet toy.

BACKGROUND OF THE PRESENT INVENTION

As people's living standards continue to improve, keeping pets has become a trend for modern people. Keeping pets requires playing with them, leading to a large number of pet toy on the market.

However, existing pet toy are mostly exposed, unable to adapt to the curious nature of pets to effectively attract them to play and increase their interest in playing.

Summary of Present Invention

The purpose of this application is to provide pet toy that can attract pets to play with their curiosity and increase their interest in playing.

To achieve the above objectives, the present application provides a pet toy. The pet toy comprises a flexible bag, a driving component, and a movable component. The flexible bag has a storage space and notches. The notches are located at edges of the flexible bag and connected to the storage space; A fixed part of the driving component is connected to the flexible bag, and a driving part of the driving component is located in the storage space and connected to a fixed end of the movable component. The driving part of the driving component drives the movable component to move. The movable component partially extends and retract from any one of the notches during a movement process.

In the present application, the driving component drives the movable component to move, and during the movement of the movable component, part of the movable component can extend and retract from any one of the notches. In this way, when using the pet toy, the driving component can extend and retract the movable component from any one of the notches through the driving part, visually creating a visual effect of the movable component appearing and disappearing alternately, fully arousing the curiosity of pets, achieving the attraction effect on pets, and enhancing the desire of pets to play. Moreover, when any side of pet toy is facing upwards, it can prevent the movable component from directly exposed outside, thus avoiding the issue of being unable to play.

BRIEF DESCRIPTION OF THE DRAWINGS

In order to illustrate the technical solution in the embodiments of the present application more clearly, a brief introduction will be made to the drawings required in the description of the embodiments. It is obvious that the drawings described below are only some embodiments of the present application. Ordinary technicians in this field can obtain other drawings based on these drawings without creative work.

DETAILED DESCRIPTION

Figure 1:
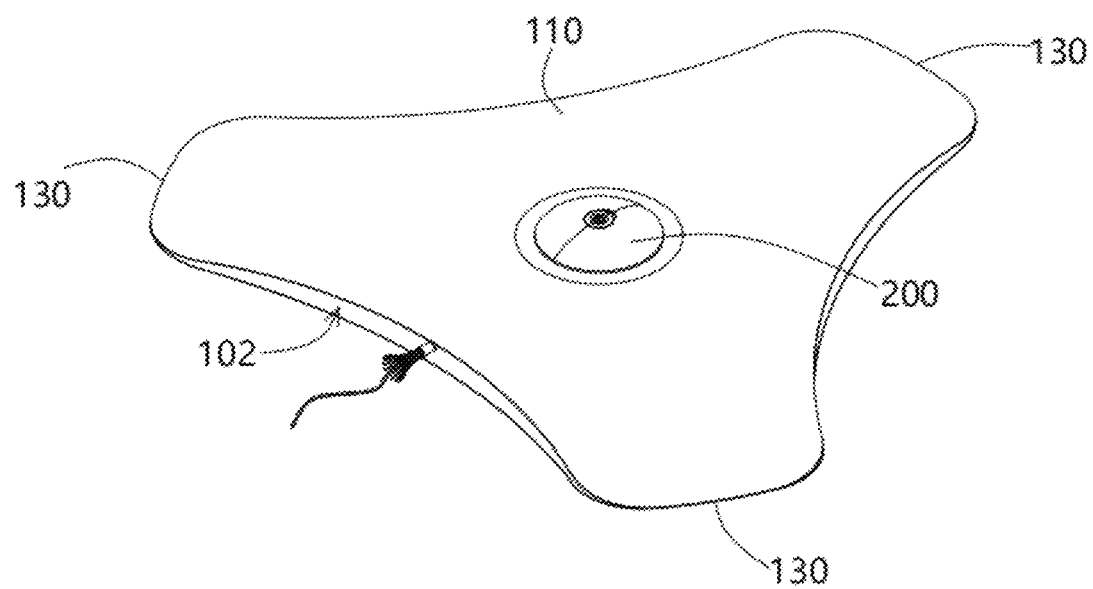
FIG. 1 is a first perspective view of a pet toy in one embodiment provided in the present application.
Figure 2:
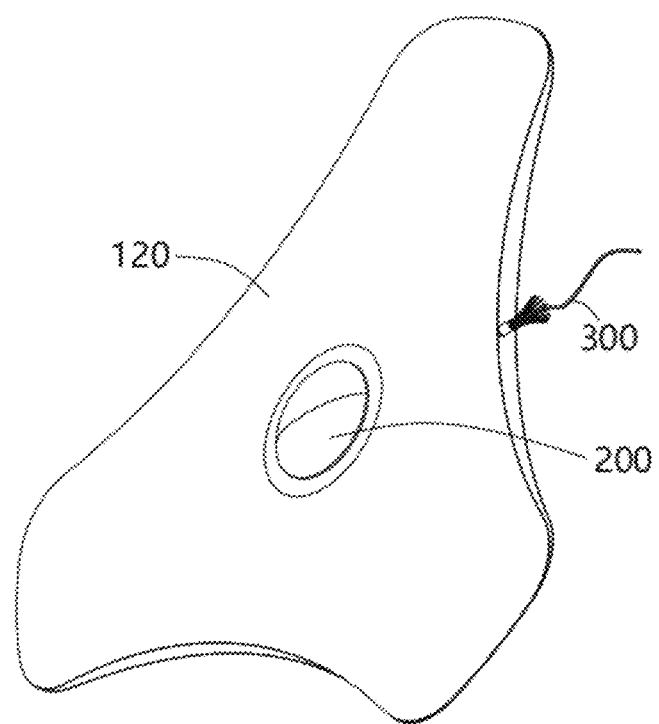
FIG. 2 is a second perspective view of the pet toy in one embodiment provided in the present application.
Figure 3:
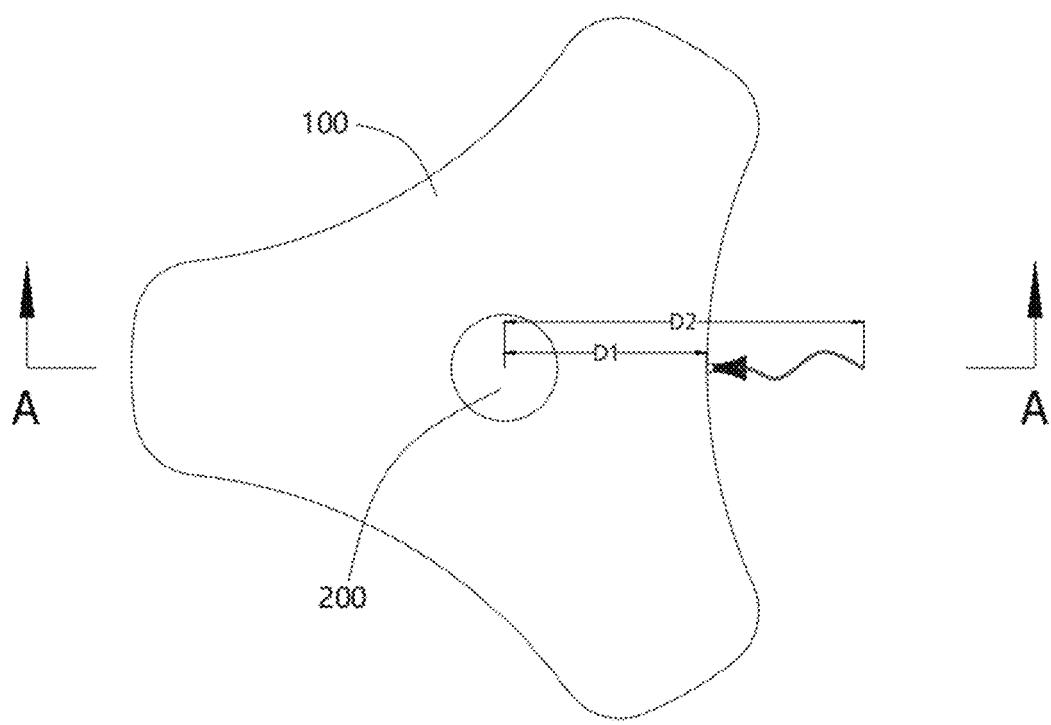
FIG. 3 is a top view schematic diagram of the pet toy in one embodiment provided in the present application.

As people's living standards continue to improve, keeping pets has become a trend for modern people. Keeping pets requires playing with them, leading to a large number of pet toy on the market. However, existing pet toy are mostly exposed, and pets lose interest after playing for a while, unable to adapt to the curious nature of pets and effectively attract them to play, thus increasing their interest in playing.

For example, in related technologies, a rotating piece is set under the fabric laid on the ground to attract pets to play by rotating under the fabric. However, during the rotation process, some parts of the rotating piece always remain outside the fabric, unable to achieve the enticing effect of hiding and appearing from time to time, and cannot fully stimulate the pet's passion for playing. Furthermore, this toy can only be played on one side. When the toy is flipped to the other side, the fabric cannot cover the rotating piece, greatly reducing the pet's desire to play and affecting the pet's user experience.

In response to the technical issues mentioned above, the present application propose to create a double-layer fabric bag structure and place a rotatable component inside the space formed by the bag structure. This design prevents the rotating piece from exposing outside when any side of pet toy is facing upwards. In addition, in the present application, notches are defined on sides of the bag body, allowing the rotating piece to extend and retract from any one of the notches during rotation, achieving a tantalizing effect of appearing and disappearing, and enhancing the pet's desire to play.

In order to make the purpose, technical solution, and advantages of the embodiments of the present application clearer, the technical solutions in the embodiments of the present application will be described clearly and completely in conjunction with the drawings in the embodiments of the present application. Obviously, the described embodiments are part of the embodiments of the present application, not all of them.

Please refer to FIGS. 1 to 4 together, in one possible embodiment, the pet toy may include a shielding component. The shielding component has a storage space 101 and notches 102. The notches 102 are located around the shielding component and are connected to the storage space 101. In other words, the shielding component enclose the storage space 101, and the edges of the shielding component are provided with the notches communicated with the storage space 101.

The pet toy may include a driving component 200 and a movable component 300. A fixed part 201 of the driving component 200 is connected to the shielding component, so that the fixed part 201 of the driving component 200 is fixed relative to the shielding component. The driving part 202 of the driving component 200 is located in the storage space 101 and connected to the fixed end of the movable component 300. The driving part 202 of the driving component 200 is configured to drive the movement of the movable component 300, and during the movement of the movable component 300, the movable component 300 is able to partially extend and retract from any one of the notches 102.

In this way, when using the pet toy, the driving component 200 is able to drive the movable component 300 to extend and retract from any one of the notches 102 through the driving part 202, visually creating the effect of the movable component 300 appearing and disappearing, fully arousing the curiosity of pets, achieving the attraction effect on pets, and increasing their desire to play. When any side of pet toy is facing upwards, the movable component 300 is not exposed directly, avoiding the inability to play.

In practical applications, the driving part 202 is able to drive the movable component 300 to randomly extend and retract from any one of the notches 102, thereby avoiding the pets from losing interest in playing due to the regularity of extension and retraction of the movable component 300.

In one feasible implementation, the shielding component has rigid characteristics, meaning that the shielding component is not easily deformed when subjected to external forces. In practical applications, the shielding component may be a hard box such as a paper box or a plastic box.

In another possible implementation, the shielding component may have flexible characteristics, meaning that the shielding component is easily deformed when subjected to external forces. In this way, pets can avoid collision with the pet toy, thereby avoiding injury caused by the pet toy, ensuring the safety of the pets during playtime. Therefore, the shielding component of the present application is preferably flexible.

In practical applications, the shielding component may be a flexible bag, and the flexible bag 100 encloses to form the storage space 101. The flexible bag 100 can be made of flexible films (such as polyethylene (PE), polypropylene (PP) and other plastic films), flexible fabrics (such as cotton, silk, nylon, polyester, etc.), and other materials.

Regarding the specific structure of the flexible bag 100, as shown in FIGS. 1 to 4, in one possible embodiment, the flexible bag 100 may include an upper piece 110 and a lower piece 120. The edges of the upper piece 110 are connected to the edges of the lower piece 120 through connecting parts 130 to form the flexible bag 100, and the connecting parts 130 are spaced along the edges of the flexible bag 100. Each of the notches 102 is formed between each two adjacent connecting parts 130. In other words, each of the notches 102 extends to the adjacent two connecting parts 130.

In practical applications, the upper piece 110 and the lower piece 120 are separated structures. The shapes and sizes of the upper piece 110 and the lower piece 120 are the same. The upper piece 110 and the lower piece 120 are connected to each other through methods such as adhesive bonding, hot melt, and stitching. The connecting areas of the upper piece 110 and the lower piece 120 form the connecting parts 130. Alternatively, the upper piece 110 and the lower piece 120 are integrally formed, with the transition parts between the upper piece 110 and the lower piece 120 being the connecting parts 130.

The driving component 200 mentioned above can adopt a telescopic structure, such as a telescopic electric cylinder, where the driving part 202 is a telescopic rod that drives the movable component 300 to extend and retract from any one of the notches 102 in a telescopic manner.

Figure 4:
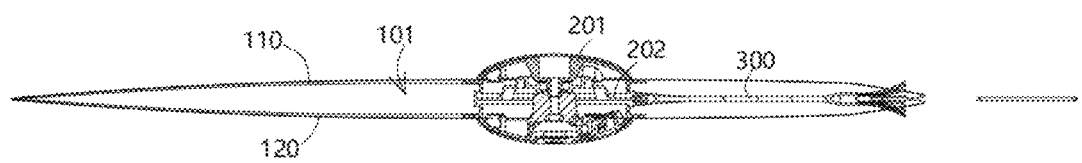
FIG. 4 is a cross-sectional view of the pet toy taken along a line A-A shown in FIG. 3.

Alternatively, the driving component 200 may adopt a rotating structure. As shown in FIG. 4, in one possible embodiment, the fixed part 201 of the driving component 200 is connected to the upper piece 110 and the lower piece 120. The driving part 202 drives the movable component 300 to rotate around the fixed part 201. The minimum distance between the edges of the flexible bag 100 with the notches 102 and the fixed part 201 (see detail in D1 of FIG. 3) is less than the distance between the free end of the movable component 300 and the fixed part 201 (see detail in D2 of FIG. 3), that is, D1<D2. In this way, when the driving part 202 drives the movable component 300 to rotate around the fixed part 201, the movable component 300 partially extends and retracts from any one of the notches.

In practical applications, the maximum distance between the edges of the flexible bag 100 with the notches 102 and the fixed part 201 is greater than the distance D2 between the free end of the movable component 300 and the fixed part 201. The distance between any one of the connecting parts 130 and the fixed part is greater than the distance D2 between the free end of the movable component 300 and the fixed part 201. In this way, during the rotation of the movable component 300, the movable component 300 is able to retract into the flexible bag 100.

Of course, the distance between any one of the connecting parts 130 and the fixed part is less than the distance D2 between the free end of the movable component 300 and the fixed part 201. In this way, during the rotation of the movable component 300, when the movable component 300 rotates to one of the connecting parts 130, the one of the connecting parts 130 can force the movable component 300 to deform and retract into the flexible bag 100.

In one feasible implementation, edges between the connecting parts 130 are at least partially recessed inward. In other words, not all the edges with the notches 102 are recessed inward. Correspondingly, during the rotation of the movable component 300, the movable component 300 can extend from any one of the notches 102 on the flexible bag 100, and the movable component 300 can also extend from any one of the notches 102 that is recessed inward.

Furthermore, each of the edges can be constructed as an arc shape, so that during the rotation of the movable component 300, when the movable component 300 passes through any one of the notches 102, the movable component 300 can gradually extend or retract. In other words, the length of the movable component 300 protruding outside the flexible bag 100 can change with the rotation of the movable component 300, further enhancing the fun of pets playing.

Figure 5:
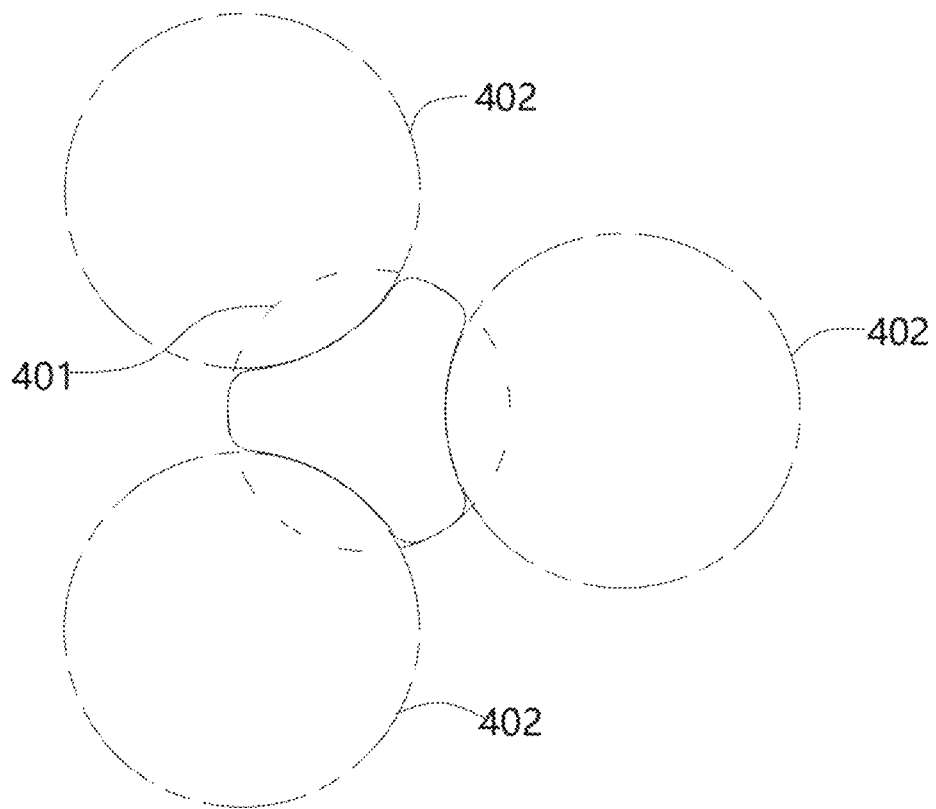
FIG. 5 is a schematic diagram showing a formation of a peripheral shape of a flexible bag in one embodiment provided in the present application.

As shown in FIG. 5, in one feasible embodiment, the peripheral shape of the flexible bag 100 can be constructed as follows: an annular array of three auxiliary circles 402 (dashed circles in FIG. 5) around a center of the center circle 401 (dotted circle in FIG. 5), the three auxiliary circles 402 intersect the center circle 401, and then overlapping parts of the three auxiliary circles 402 and the center circle 401 are cut out to form the peripheral shape of the flexible bag 100. The notches are set at the concave areas of the peripheral shape of the flexible bag 100, and the connecting parts 130 are set at the convex area of the peripheral shape of the flexible bag 100.

Furthermore, a smooth transition through a curved surface between the concave and convex edges ensures the smoothness of the edges of the flexible bag 100, enhancing the tactile sensation for pets and the aesthetics of the flexible bag 100. In one possible implementation, the movable component 300 may include a rod 310. The rod 310 has a certain rigidity, so that the driving part 202 is able to drive the rod 310 to extend or retract from any one of the notches 102. The rod 310 can also have a certain degree of flexibility, so that the rod 310 deforms to a certain extent when poking the pet, protecting the pet from harm.

Figure 6:
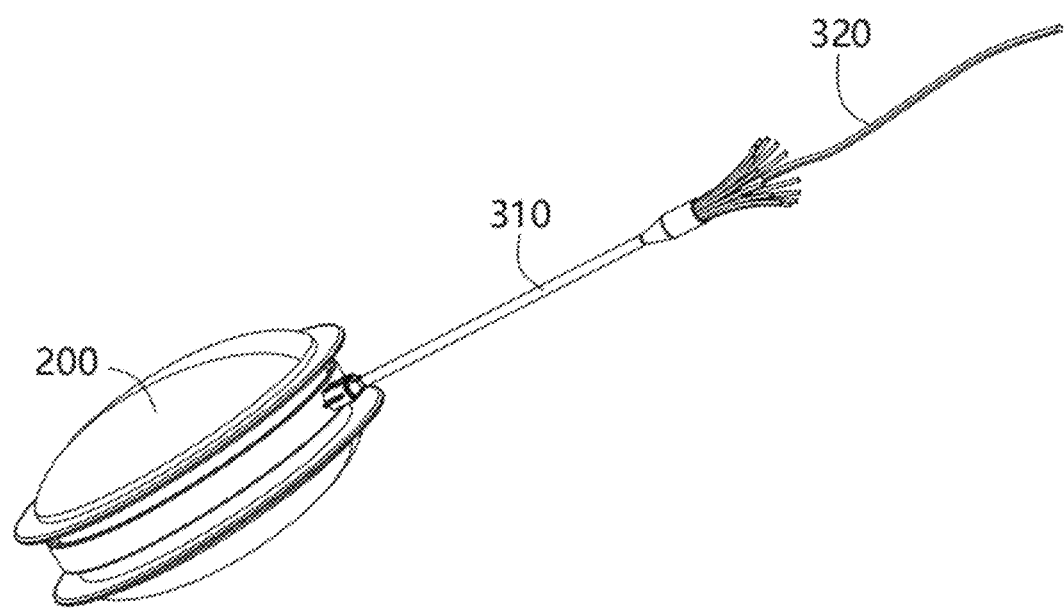
FIG. 6 is a schematic diagram of the connection between a driving component and a movable component in one embodiment provided in the present application.

As shown in FIG. 6, in another feasible embodiment, the movable component 300 may include a rod 310 and a flexible rope 320. One end of the rod 310 is connected to the driving part 202, the other end of the rod 310 is connected to the flexible rope 320, and the stiffness of the rod 310 is greater than the stiffness of the flexible rope 320. By adding the flexible rope 320, when the movable component 300 is driven by the driving part 202, to extend from any one of the notches 102, the flexible rope 320 can swing irregularly, further attracting pets to play and have fun.

Figure 7:
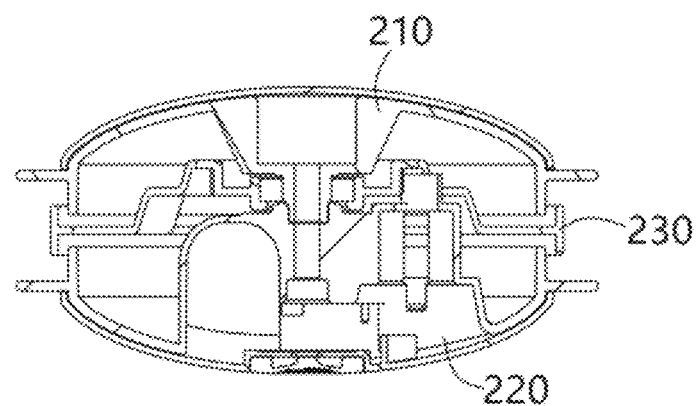
FIG. 7 is a cross-sectional schematic diagram of the driving component in one embodiment provided in the present application.
Figure 8:
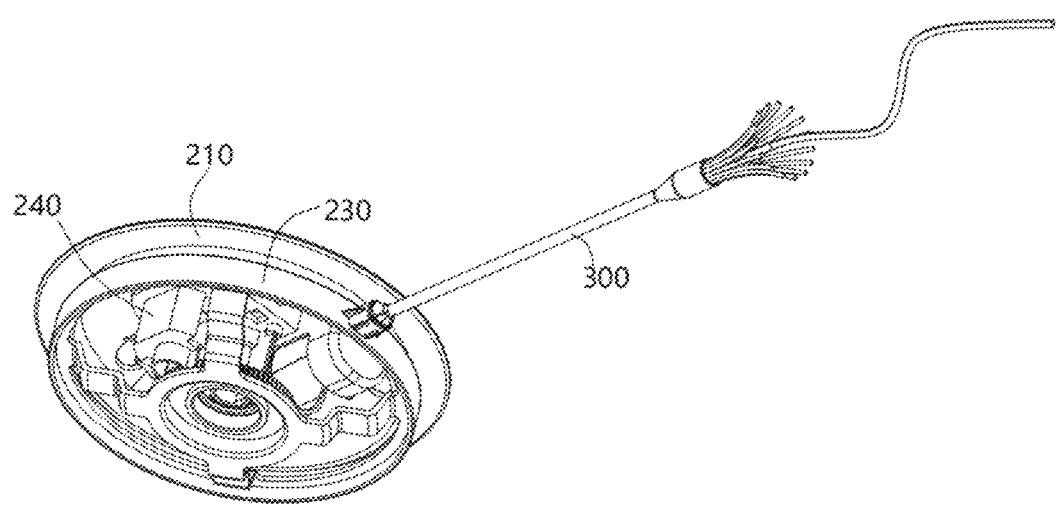
FIG. 8 is a schematic diagram of the partial structure of the driving component in one embodiment provided in the present application.

Regarding the specific structure of the driving component 200, as shown in FIGS. 6 to 8, in one possible embodiment, the driving component 200 includes an upper cover body 210, a lower cover body 220, and a rotating body 230. The upper cover body 210, the rotating body 230, and the lower cover body 220 are stacked in sequence, and the center of the upper cover body 210 passes through the rotating body 230 to connect with the lower cover body 220. The upper cover body 210 and the lower cover body 220 together form the fixed part 201, and the rotating body 220 forms the driving part 202.

In practical applications, the upper piece 110 is fixed on the upper cover body 210, the lower piece 120 is fixed on the lower cover body 230, and the movable component 300 is connected to the rotating body 230.

In this embodiment, the driving component 200 may also include a motor 240 and a main gear, the motor 240 is mounted on the upper cover body 210 and/or the lower cover body 220, and the output shaft of the motor 240 is connected to the main gear. The rotating body 230 is connected between the upper cover body 210 and the lower cover body 220, the rotating body 230 has a gear ring engaged with the main gear, and a positioning hole is provided in the gear ring. The center of the upper cover body 210 passes through the positioning hole to connect with the lower cover body 220, so that when the motor 240 drives the gear ring to rotate the rotating body 230, it can avoid interference between the upper cover body 210 and the lower cover body 220 at the connection point with the rotating body 230.

The terms such as "upper" and "lower" are configured to describe the relative positional relationships of various structures in the accompanying drawings for the sake of clarity in the description, rather than to limit the scope of the present application. Changes or adjustments in the relative relationships, without substantial changes in the technical content, are also considered within the scope of the present application.

It should be noted that, in this application, unless otherwise specified and limited, the first feature can be in direct contact with the second feature "upper" or "lower", or the first and second features can be indirectly in contact through an intermediate medium. Moreover, the first feature "above", "top", and "over" the second feature can mean that the first feature is directly above or slightly above the second feature, or simply that the first feature is at a higher elevation than the second feature. The first feature "below", "under", and "beneath" the second feature can mean that the first feature is directly below or slightly below the second feature, or simply that the first feature is at a lower horizontal level than the second feature.

In addition, in this application, unless otherwise specified and limited, terms such as "installation", "connection", "fixation", etc. should be broadly interpreted. For example, it can be a fixed connection or a detachable connection, or integrated; it can be directly connected or indirectly connected through an intermediate medium, it can be an internal connection of two components or an interaction relationship between two components. For ordinary technical personnel in this field, they can understand the specific meanings of the above terms in this application according to the specific situation.

In the description of this specification, the terms "an embodiment", "some embodiments", "illustrative embodiments", "examples", "specific examples", or "some examples" refer to at least one embodiment or example described with specific features, structures, materials, or characteristics in conjunction with the embodiment or example. The illustrative descriptions of the above terms in this manual do not necessarily refer to the same embodiments or examples. Moreover, the specific features, structures, materials, or characteristics described can be combined in any suitable manner in any one or more embodiments or examples.

Finally, it should be noted that the above examples are only configured to illustrate the technical solutions of the present application, rather than limiting them; although the above examples have been detailed in the present application, ordinary skilled persons in the art should understand that they can still modify the technical solutions recorded in the above examples, or equivalently replace some or all technical features. These modifications or replacements do not cause the essence of the corresponding technical solutions to depart from the scope of the technical solutions of the various examples in the present application.

What is claimed is:

1. A pet toy, comprising:
    a flexible bag;
    a driving component; and
    a movable component;
    wherein the flexible bag defines a storage space and notches, the notches are defined around the flexible bag, and the notches are communicated with the storage space;
    a fixed part of the driving component is connected to the flexible bag, a driving part of the driving component is disposed inside the storage space and connected to a fixed end of the movable component, the driving part of the driving component drives the movable component to move, and during a movement process of the movable component, the movable component partially extends and retracts from any one of the notches;
    the movable component comprises a rod and a flexible rope; and
    a first end of the movable component is connected to the driving component, and a second end of the rod is connected to the flexible rope, a stiffness of the rod is greater than a stiffness of the flexible rope;
    wherein the flexible bag comprises an upper piece and a lower piece, wherein edges of the upper piece and edges of the lower piece are connected to each other through connecting parts to form the flexible bag, the connecting parts are spaced along edges of the flexible bag, and each of the notches is formed between each two adjacent connecting parts, and wherein the upper piece and the lower piece are not connected to each other at the notches.

2. The pet toy according to claim 1, wherein the fixed part of the driving component is connected to the upper piece and the lower piece, the driving part drives the movable component to rotate around the fixed part, and the minimum distance between the edges of the flexible bag and the fixed part is less than a distance between a free end of the movable component and the fixed part, so that the movable component is allowed to partially extend and retract from any one of the notches.

3. The pet toy according to claim 2, wherein the maximum distance between the edges of the flexible bag and the fixed part is greater than the distance between the free end of the movable component and the fixed part.

4. The pet toy according to claim 2, wherein edges between the connecting parts are at least partially recessed.

5. The pet toy according to claim 4, wherein the edges between the connecting parts that are recessed are arc-shaped.

6. The pet toy according to claim 5, wherein a peripheral shape of the flexible bag is constructed astin the following manner in which three auxiliary circles disposed around a center of a center circle in a circular array, wherein the three auxiliary circles intersect with the center circle, and overlapping portions of the center circle and the three auxiliary circles are cut thus forming the peripheral shape of the flexible bag.

7. The pet toy according to claim 6, wherein the edges between the connecting parts and edges of the connecting parts are smoothly transitioned.

8. The pet toy according to claim 2, wherein the driving component comprises an upper cover body, a lower cover body, and a rotating body, the upper cover body, the rotating body, and the lower cover body are stacked in sequence, a center of the upper cover body passes through the rotating body to connect with the lower cover body, the upper cover body and the lower cover body jointly form the fixed part, and the rotating body forms the driving part.

9. A pet toy, comprising:
a flexible bag;
a driving component; and
a movable component;
wherein the flexible bag defines a storage space and notches, the notches are defined around the flexible bag, and the notches are communicated with the storage space;
a fixed part of the driving component is connected to the flexible bag, a driving part of the driving component is disposed inside the storage space and connected to a fixed end of the movable component, the driving part of the driving component drives the movable component to move, and during a movement process of the movable component, the movable component partially extends and retracts from any one of the notches;
the flexible bag comprises an upper piece and a lower piece,
edges of the upper piece and edges of the lower piece are connected to each other through connecting parts to form the flexible bag, the connecting parts are spaced along edges of the flexible bag, and each of the notches is formed between each two adjacent connecting parts; and
the fixed part of the driving component is connected to the upper piece and the lower piece, the driving part drives the movable component to rotate around the fixed part, and the minimum distance between the edges of the flexible bag and the fixed part is less than a distance between a free end of the movable component and the fixed part, so that the movable component is allowed to partially extend and retract from any one of the notches.

\* \* \* \* \*